United States Patent [19]

Miyata

[11] Patent Number: 4,675,356
[45] Date of Patent: Jun. 23, 1987

[54] SYNTHETIC RESIN COMPOSITION HAVING REDUCED CORROSION-CAUSING TENDENCY AND COLORATION

[75] Inventor: Shigeo Miyata, Takamatsu, Japan

[73] Assignee: Kyowa Chemical Industry Co., Ltd., Tokyo, Japan

[21] Appl. No.: 823,643

[22] Filed: Jan. 29, 1986

[30] Foreign Application Priority Data

Jan. 29, 1985 [JP] Japan ............................ 60-13504

[51] Int. Cl.$^4$ ............................................. C08K 3/26
[52] U.S. Cl. ................................... 524/424; 524/395; 524/398; 524/399; 524/423; 524/434; 524/417; 524/431; 524/429; 524/404; 524/413; 524/436; 524/437
[58] Field of Search ............... 524/395, 398, 399, 423, 524/424, 434, 417, 431, 429, 404, 413, 436, 437; 423/306, 367, 397, 431, 432, 518, 279

[56] References Cited

U.S. PATENT DOCUMENTS

| | | | |
|---|---|---|---|
| 3,879,523 | 4/1975 | Miyata et al. | 423/518 |
| 3,879,525 | 4/1975 | Miyata et al. | 423/518 |
| 4,284,762 | 8/1981 | Miyata et al. | 524/451 |
| 4,299,759 | 10/1981 | Miyata et al. | 524/441 |
| 4,379,882 | 4/1983 | Miyata | 524/436 |

FOREIGN PATENT DOCUMENTS 1336866  11/1973  United Kingdom .

*Primary Examiner*—Veronica P. Hoke
*Attorney, Agent, or Firm*—Sherman and Shalloway

[57] ABSTRACT

A synthetic resin composition having reduced corrosion-causing tendency and coloration, said composition comprising (A) 100 parts by weight of a synthetic resin containing halogen and/or an acidic substance, and (B) 0.001 to 50 parts by weight of a hydrotalcite solid solution represented by the following formula (1)

$$[(M_1^{2+})_{y1}(M_2^{2+})_{y2}]_{1-x}M_x^{3+}(OH)_2 A_{x/n}{}^{n-} \cdot mH_2O \quad (1)$$

wherein $M_1^{2+}$ represents at least one divalent metal cation, $M_2^{2+}$ represents at least one divalent metal cation, $M^{3+}$ represents a trivalent metal cation, $A^{n-}$ represents an anion having a valency of n, and x, y1, Y2 and m are positive numbers represented by the following expressions $0 < x \leq 0.5$,
$0 < y1$,
$0 < y2$,
$0.5 \leq y1 + y2 < 1$, and
$0 \leq m < 2$; and a method for preventing the corrosion-causing tendency or coloration of a synthetic resin containing halogen and/or an acidic substance by using the above formula (1) compound.

11 Claims, No Drawings

SYNTHETIC RESIN COMPOSITION HAVING REDUCED CORROSION-CAUSING TENDENCY AND COLORATION

This invention relates to an agent comprising a hydrotalcite solid solution as an active ingredient which can impart anticorrosion or anticoloration properties to a synthetic resin containing halogen and/or an acidic substance and is therefore useful for markedly reducing the corrosion-causing tendency or coloration of such a synthetic resin, and to a resin composition containing the aforesaid agent. This active ingredient characteristically differs from similar agents previously proposed because it is a hydrotalcite solid solution containing dissimilar divalent metals $M_1^{2+}$ and $M_2^{2+}$.

More specifically, this invention relates to an agent capable of imparting anticorrosion or anticoloration properties to a synthetic resin containing halogen and/or an acidic substance, said agent comprising as an active ingredient a hydrotalcite solid solution represented by the following formula (I)

$$[(M_1^{2+})_{y1}(M_2^{2+})_{y2}]_{1-x}M_x^{3+}(OH)_2A_{x/n}^{n-}\cdot mH_2O \qquad (1)$$

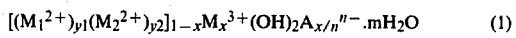

wherein $M_1^{2+}$ represents at least one divalent metal selected from the group consisting of Mg, Ca, Sr and Ba, $M_2^{2+}$ represents at least one divalent metal cation selected from the group consisting of Zn, Cd, Pb and Sn, $M^{3+}$ represents a trivalent metal cation, $A^{n-}$ represents an anion having a valency of n, and x, y1, Y2 and m are positive numbers represented by the following expressions $0 < x \leq 0.5$, $0 < y1$, $0 < y2$, $0.5 \leq y1 + y2 < 1$, and $0 \leq m < 2$;

and to a resin composition comprising the above agent.

In the present invention, the term "synthetic resin", denotes not only synthetic resins in general but also synthetic rubbers and elastomers.

The agent of this invention is widely useful for the prevention of the corrosion-causing tendency or coloration of synthetic resins containing halogens and/or acidic substances, particularly those synthetic resins which contain halogens and/or acidic substances derived from at least one kind of catalysts, monomers, and post-treating or addition agents (to be referred to as post-treating agents).

The present invention provides an anticorrosive or anticoloration synthetic resin composition comprising (a) 100 parts by weight of a synthetic resin containing halogen and/or an acidic substance derived from at least one kind of catalysts, monomers and post-treating agents, and (B) about 0.001 to about 50 parts by weight of an anticorrosion or anticoloration imparting agent represented by general formula (1).

Various synthetic resins containing halogens and/or acidic substances derived from at least one of catalysts, monomers and post-treating agents are known. They include, for example, synthetic resins obtained by using catalysts containing halogens and/or acidic substances such as Friedel-Crafts catalysts and Ziegler catalysts, for example polyacetal, butyl rubber, polyethylene and polypropylene; synthetic resins derived from monomers containing halogens and/or acidic substances, such as vinyl chloride-type polymers and copolymers, vinyl acetate-type polymers or copolymers, polymers and copolymers of epihalohydrins such as epichlorohydrin, polyfluoroolefin polymers and copolymers (fluorine resins) such as polyfluoroethylene polymers, and blends of these; synthetic resins which are post halogenated or washed with acids such as sulfuric acid, phosphoric acid or hydrochloric acid, for example post-chlorinated vinyl chloride-type resins such as chlorinated polyvinyl chloride, post-chlorinated olefin resins such as chlorinated polyethylene, post-chlorosulfonated olefin resins such as chlorosulfonated polyethylene and post-halogenated rubbers such as brominated butyl rubber; and synthetic resins containing post-treating agents such as halogen-containing fire retardants or flame retardants, halogen-containing coloring agents and phosphorus-containing or phenolic antioxidants.

These synthetic resins containing halogens and/or acidic substances tend to corrode a metallic part of a dryer, a molding machine, etc. with which they make contact during a drying step, a molding step, etc. Molded products of these resins undergo coloration (or deterioration). In addition, these synthetic resins or their molded articles also undergo degradation in heat stability, weatherability, water resistance, insulating property, etc.

Olefin resins (including rubbers or elastomers), and such thermosetting resins as acetal resin, coumarone resin and phenolic resins obtained by using catalysts containing halogens and/or acidic substances contain the halogens and/or the acidic substances derived from the used catalysts. These substances are removed or inactivated by various treatments, for example by using such means as neutralization with alkalies and washing with water. By such treatments, however, it is difficult to remove these substances to an extent sufficient to avoid the corrosion or coloration mentioned hereinabove. Such catalysts include, for example, well-known Friedel-Crafts catalysts composed of at least one halide of a metal of Groups II–VI or VIII of the periodic table, such as $ZnCl_2$, $AlCl_3$, $BF_3$, $SnCl_4$, $TiCl_4$, $BiCl_3$, $SbCl_5$, $TeCl_2$, $TeCl_4$ and $FeCl_3$ with or without an inorganic acid such as HCl, HF, $H_2SO_4$, $P_2O_5$ or $H_3PO_4$, and many known Ziegler catalysts composed of a halogen-containing transition metal catalyst component such as a halogen-containing vanadium or titanium compound (e.g., vanadium oxyhalides, vanadium halides, titanium halides, or titanium alkoxy or aryloxy halides) or a halogen-containing transition metal catalyst component derived from such a vanadium or titanium compound and a magnesium or manganese compound and/or an electron donor with or without adjuvants and an organometallic compound catalyst component of a metal of Groups I–III of the periodic table such as an organoaluminum compound.

Synthetic resins derived from halogen-containing monomers and post-halogenated synthetic resins likewise have the trouble of causing corrosion or undergo coloration. In addition, they undergo thermal degradation during molding and processing, or when used in cable coating, they may corrode cables. In the case of halogenated rubbers, the reaction product of an acid acceptor such as magnesium oxide used during vulcanization with the halogen component reduces the water resistance, insulation resistance, etc. of the rubbers.

In the production of styrene-type synthetic resins such as ABS resin and polystyrene resins by suspension polymerization, the suspending agents used, such as magnesium hydroxide, calcium phosphate and calcium carbonate, tend to remain in the resulting resins and degrade their properties. It is the usual practice to avoid this disadvantage by adding an acid such as sulfuric acid or hydrochloric acid in an amount exceeding the amount of the suspending agent and dissolving the suspending agent. As a result, the acid component remains in the resins, and causes the troubles of corrosion or coloration and also degrades the weatherability of the resins.

As stated above, the synthetic resins containing halogens and/or acidic substances derived from at least one of catalysts, monomers and post-treating agents commonly have the troubles of corrosion or coloration (or degradation), and the resins also undergo degradation in heat stability, weatherability, water resistance, insulation, etc. as a result of direct or indirect involvement of these troubles.

It is known to use hydrotalcites in an attempt to overcome these troubles of synthetic resins containing halogens and/or acidic substances.

For example, Japanese Laid-Open Patent Publication No. 49258/1977 discloses an attempt to reduce the corrosion-causing tendency and yellowing of a polyolefin produced by a Ziegler-type catalyst and proposes a polyolefin composition comprising the polyolefin produced by using the above catalyst and at least 0.01% by weight, preferably 0.1 to 1.0% by weight, of a double compound represented by the general formula $$M_xAl_y(OH)_{2x+3y-2z}(A)_z \cdot aH_2O$$

wherein M represents Mg, Ca or Zn, A represents $CO_3$ or $HPO_4$, x, y and z are positive numbers, and a is 0 or a positive number.

This patent document, however, fails to describe or suggests the use of a hydrotalcite solid solution containing at least two dissimilar divalent metals, as can be seen from the definition of M in the above formula.

Japanese Laid-Open Patent Publication No. 80447/1980 filed by the present applicant proposes a method of preventing the corrosion-causing tendency and coloration of a halogen-containing polyolefin which comprises including about 0.01 to about 5 parts by weight of a hydrotalcite having a BET specific surface area of not more than 30 m²/g in 100 parts by weight of a polyolefin containing halogen derived from a polymerization catalyst and/or post-halogenation, and a polyolefin composition containing the hydrotalcite. Japanese Laid-Open Patent Publication No. 80445/1980 filed by the same applicant proposes a method of preventing thermal and ultraviolet degradation of a halogen-containing thermoplastic resin, which comprises including about 0.01 to about 5 parts by weight of a hydrotalcite having a BET specific surface area of not more than 30 m²/g in 100 parts by weight of a thermoplastic resin (excepting halogen-containing polyolefins) containing halogens and/or acidic substances derived from catalysts and/or monomers and/or post-halogenation, and a thermoplastic resin composition containing the hydrotalcite. These patent documents show hydrotalcites of the following formula (a)

$$Mg_{1-x}Al_x(OH)_2A_{x/n}{}^{n-} \cdot mH_2O \quad (a)$$

wherein $0 < x \leq 0.5$, $A^{n-}$ represents an anion having a valence of n, preferably $CO_3{}^{2-}$ or $SO_4{}^{2-}$, and m is a positive number. These patent documents neither describe nor suggest the use of hydrotalcite solid solution containing at least two dissimilar divalent metals, as can be seen from the above formula (a).

Japanese Laid-Open Patent Publication No. 145937/1981 filed by the same applicant discloses an agent for preventing the corrosion-causing tendency or coloration of a polyolefin containing halogen derived from a polymerization catalyst and/or post-halogenation, which agent comprises as an active ingredient a hydrotalcite represented by the following formula $$Mg_xAl(OH)_{2x+3-ny-2z}(A^{n-})_y(CO_3)_z \cdot mH_2O$$

wherein $A^{n-}$ represents an anion having a valence of n and a pKa of not more than 7, x, y, z and m are positive numbers satisfying the following expressions $2 \leq x \leq 20$, $0 < y < 2$, $0 < z < 1$, and $0 \leq m < 20$, surface-treated with an anionic surface-active agent or non-treated with it; and a halogen-containing polyolefin composition comprising the hydrotalcite. This patent document neither describes or suggests the use of hydrotalcite solid solutions containing at least two dissimilar divalent metals, as can be seen from the above formula.

Japanese Laid-Open Patent Publication No. 83538/1982 discloses a halogen-inactivating agent for halogen-containing polyolefins comprising as an active ingredient an aluminum magnesium complex hydroxide having a BET specific surface area of not more than about 40 m²/g and represented by the following formula $$Mg_{1-x}Al_x(OH)_{2+z} \cdot mH_2O$$

wherein x and m are positive numbers satisfying the following expressions $0 < x < 0.5$ and $0 \leq m < 2$, and a polyolefin composition containing the inactivating agent. This patent document also fails to describe or suggest the use of hydrotalcite solid solutions containing at least two dissimilar divalent metals, as can be seen from the above formula.

In the prior art techniques discussed above, hydrotalcites containing one type of divalent metal are exclusively used to reduce the corrosion-causing tendency or coloration (or degradation) of synthetic resins containing halogens and/or acidic substances. A typical example is the hydrotalcite represented by formula (a).

Investigations of the present inventor have shown that the hydrotalcites represented by formula (a) above in which the divalent metal is of one type, particularly an alkaline earth metal (Group IIa) show an excellent effect in reducing the corrosion-causing tendency of synthetic resins containing halogens and/or acidic substances, but their effects of inhibiting the coloration (or degradation, such as heat resistance or weatherability) of the synthetic resins are not high enough to be satisfactory. It has also been found that when these hydrotalcites are incorporated in olefinic resins containing phenolic antioxidants, they do not show a satisfactory effect of inhibiting the yellowing tendency of the resins. It has also been found that when they are incorporated in vinyl chloride resin, they do not show a satisfactory effect of inhibiting the coloration of the resins in reddish colors. The present inventor has also found that hydrotalcites in which the divalent metal is of one type, particularly Zn or Cd of Group IIb, or Sn or Pb of Group IVb have poor heat resistance, and tend to decompose at the molding temperatures of the resins so that their effect of inhibiting corrosion-causing tendency or coloration cannot be expected.

Quite unexpectedly, the present inventor has now found that a hydrotalcite solid solution containing two or more divalent metals, i.e. at least one divalent metal selected from the group consisting of Mg, Ca, Sr and Ba which belong to alkaline earth metals and at least one divalent metal selected from the group consisting of Zn, Cd, Pb and Sn which belong to Groups IIb and IVb of the periodic table, has high heat resistance and gives an agent capable of imparting satisfactory anticorrosion and anticoloration properties to synthetic resins containing halogens and/or acidic substances.

It has also been found that when Ca, Sr and Ba belonging to $M_1^{2+}$ in formula (1) is used alone, it is difficult to synthesize compounds having the structure of the hydrotalcites of formula (1), but that when it is used in combination with a reaction component capable of giving $M_2^{2+}$ and/or Mg, a hydrotalcite solid solution having structure of formula (1) can be easily synthesized.

The hydrotalcite solid solution of formula (1) containing two or more types of divalent metal show the advantage that when it is incorporated in vinyl chloride resins, for example, as an agent capable of imparting anticorrosion and anticoloration properties, the transparency of the resins is not reduced, and the heat resistance of the resins is improved.

According to this invention, the coloration (degradation) of synthetic resins containing halogens and/or acidic substances can be satisfactorily prevented presumably because in the hydrotalcite solid solution specified in this invention, the alkaline earth metal hydroxide $M_1^{2+}(OH)_2$ having strong basicity and its hydroxide is complexed with the weakly acidic or acidic metal hydroxide $M_2^{2+}(OH)_2$ of Group IIB and/or IVB, and therefore the basicity of $M_1^{2+}(OH)_2$ is weakened or neutralized.

It has also been found that even at temperatures exceeding about 150° C., the hydrotalcite solid solutions specified in this invention do not decompose and thus do not lose their ion exhangeability acting on the halogens and/or the neutralization of acidic substances, and prevent the corrosion-causing tendency of synthetic resins containing halogens and/or acidic substances fully satisfactorily; and that when these resins containing the hydrotalcite solid solutions are molded, difficulties such as foaming or the formation of a flash pattern do not arise.

Thus, according to this invention, there is provided an agent capable of imparting anticorrosion or anticoloration properties to synthetic resins containing halogens and/or acidic substances derived from at least one kind of catalysts, monomers and post-treating agents. This agent can reduce the coloration, thermal and ultraviolet degradation and corrosion-causing tendency of such synthetic resins and improve their weatherability, water resistance and electric insulation with good reproducibility and excellent results. In addition, this agent has good uniform dispersibility in the resins, and can avoid foaming and/or poor hot flowability during molding of such resins. Furthemore, molded products obtained from such resins have good appearance.

When the agent in accordance with this invention is to be applied to a vinyl chloride-type polymer or copolymer, it can achieve the aforesaid aadvantages without adversely affecting the transparency of the polymer or copolymer by selecting a combination of Mg and Ca as the divalent metal $M_1^{2+}$ in formula (1).

It is an object of this invention to provide a new type of agent capable of imparting anticorrosion or anticoloration properties to synthetic resins containing halogens and/or acidic substances, which comprises the hydrotalcite solid solution of formula (1) as an active ingredient.

Another object of this invention is to provide a resin composition comprising a synthetic resin containing halogen and/or an acidic substance and a specified amount of the aforesaid agent.

The above and other objects of this invention will become apparent from the following description.

The hydrotalcite solid solution used in this invention is represented by the following formula (1)

$$[(M_2^{2+})_{y1}(M_1^{2+})_{y2}]_{1-x}M_x^{3+}(OH)_2 A_{x/n}^{n-} \cdot mH_2O \quad (1)$$

wherein $M_1^{2+}$ represents at least one divalent metal cation selected from the group consisting of Mg, Ca, Sr and Ba, $M_2^{2+}$ represents at least one divalent metal cation selected from the group consisting of Zn, Cd, Pb and Sn, x, y1, y2 and m represent positive numbers satisfying the following expressions $0 < x \leq 0.5$, $0 < y1$, $0 < y2$, $0.5 \leq y1 + y2 < 1$, and $0 \leq m < 2$.

In formula (1), $M_1^{2+}$ may be at least one divalent metal selected from the group consisting of Mg, Ca, Sr and Ba. Mg, Ca, a combination of Mg and Ca, a combination of Mg and Sr and a combination of Mg and Ba are preferred. Mg and a combination of Mg and Ca are especially preferred.

In formula (1), $M_2^{2+}$ may be at least one divalent metal selected from group consisting of Zn, Cd, Pb and Sn. Zn, Cd, Pb, Zn and Cd are preferred. Zn, or Cd or both are especially preferred.

In formula (1), $M^{3+}$ is a trivalent metal, and is, for example, Al, Bi, In, Sb, B, Ga and Ti. Of these, Al is especially preferred.

In formula (1), $A^{n-}$ represents an anion having a valence of n such as $CO_3^{2-}$, $OH^-$, $HCO_3^-$, $ClO_4^-$, an acetate ion (—), a salicylate ion (—), a citrate ion (3—), a tartrate ion

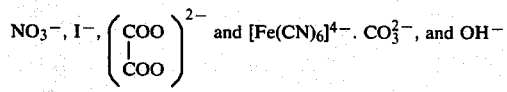

are especially preferred.

In formula (1), x is a positive number of $0 < x \leq 0.5$, preferably $0.2 \leq x \leq 0.5$, more preferably $0.2 \leq x \leq 0.4$, especially preferably $0.25 \leq x \leq 0.35$. y1 and y2 are positive numbers satisfying the expressions $0 < y1$, $0 < y2$, and $0.5 \leq y1 + y2 \leq 1$. m is a number represented by $0 \leq m$, for example $0 \leq m \geq 2$. Preferably, $y1 \leq y2$, especially preferably $y1 > y2$.

Examples of preferred compounds of formula (1) may be represented by the following formula (1)'.

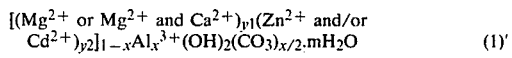 (1)' wherein x, y1, y2 and m are as defined with regard to formula (1).

The hydrotalcite solid solutions of formula (1) or (1)' within the formula (1) have the same crystalline structure as hydrotalcite represented by $Mg_6Al_2(OH)_{16}CO_3.4H_2O$ and therefore shows a powder X-ray diffraction pattern similar to that of hydrotalcite, provided that the lattice constant varies in accordance with the general law of a solid solution. For example, the lattice constant becomes larger than that of hydrotalcite when a metal ion to be solid soluted has a larger ion radius than a magnesium ion and becomes smaller when the former has a smaller ion radius than the magnesium ion.

In order to impart excellent anticorrosion or anticoloration (or antidegradation) properties and advantageously improving weatherability, water resistance, insulating property and moldability at the same time, it is preferred to select those hydrotalcite solid solutions of formula (1) in which the crystal grain size is moderately grown, the distortion of the crystals is small and therefore the crystals have little tendency toward agglomeration. From this viewpoint, the hydrotalcite solid solutions of formula (1) used in this invention preferably have a crystal grain size of about 0.1 to about 1 micrometer, a BET specific surface area of not more than about 30 m$^2$/g, and an average secondary particle diameter of not more than about 5 micrometers, more preferably not more than about 2 micrometers, especially preferably not more than about 1 micrometer.

In using the hydrotalcite solid solution of formula (1) as an agent for imparting anticorrosion and anticoloration properties to synthetic resins containing halogens and/or acidic substances, the m value in formula (1) is preferably small for synthetic resin having a relatively high molding temperature. When especially high molding temperatures are desired, it is preferred to select hydrotalcite solid solutions of formula (1) subjected to a treatment of removing water of crystallization in which m is 0 or nearly 0. The treatment of removing water of crystallization can be easily carried out, for example, by treating the hydrotalcite solid solutions at a temperature of about 110° to about 400° C., preferably about 150° to about 350° C., for about 1 to about 40 hours in air or in an atmosphere such as $N_2$, He, $O_2$, $H_2$ or $CO_2$.

The hydrotalcite solid solution of formula (1) may be surface-treated with a surface-treating agent in order to improve its compatibility with the resins and its dispersibility in the resins and to increase the various effects of the agent of this invention. The surface-treating agent includes, for example, higher fatty acids, anionic surface-active agents, silane-type coupling agents, titanate-type coupling agents, and esters of glycerol with fatty acids. Specific examples of such surface-treating agents are higher fatty acids such as stearic acid, oleic acid and lauric acid; anionic surface-active agents such as sodium stearate, sodium oleate and sodium laurylbenzenesulfonate; silane-type or titanate-type coupling agents such as vinyltriethoxysilane, gamma-methacryloxypropyltriethoxysilane, isopropyltriisostearoyl titanate and isopropyltridecylbenzenesulfonyl titanate; and glycerol esters of fatty acids such as glycerol monostearate and glycerol mono-oleate.

When the surface-treating agent is a liquid or a solution in water, an alcohol, etc., the surface treatment can be carried out by mechanically mixing such a liquid-state surface-treating agent with the hydrotalcite solid solution of formula (1) as a powder or an aqueous suspension of the powder under heat or without heating. When the surface-treating agent can be melted under heat, the surface treatment may be carried out by mechanically mixing the surface-treating agent and the hydrotalcite solid solution of formula (1) as a powder under heatmelting conditions. After thorough mixing, the mixture may, as required, be subjected to water washing, dehydration, drying, pulverization, classification, etc. to obtain a surface-treated product.

The content of the surface-treating agent in the surface-treated product of the hydrotalcite solid solution of formula (1) which can be obtained as above can be varied as desired. For example, it is about 0.1 to about 10% by weight based on the weight of the hydrotalcite solid solution of formula (1).

The hydrotalcite solid solutions used in this invention can be produced by techniques known per se except that at least one component giving $M_1^{2+}$ and at least one component giving $M_2^{2+}$ are jointly used. For example, the techniques described in the applicant's Japanese Patent Publications Nos. 2280/1971 (Application No. 48349/1966), 32198/1972 (Application No. 99358/1969) 30039/1975 (Application No. 45658/1967), 29477/1973 (Application No. 120778/1970), and 29129/1976 (Application No. 123553/1970) may conveniently be used except that at least one component giving $M_1^{2+}$ and at least one component giving $M_2^{2+}$ are jointly used. Hydrotalcite solid solutions o (1) having a BET specific surface area of not more than about 30 m$^2$/g and an average secondary particle diameter of not more than about 5 micrometers can preferably be obtained by heattreating the hydrotalcite solid solutions of formula (1) obtained as above further in an aqueous medium. According to this preferred embodiment, the hydrotalcite solid solutions of formula (1) having the desired BET specific surface area and average secondary particle size can be obtained by heat-treating the hydrotalcite solid solutions of formula (1) obtained as above in an autoclave in an aqueous medium at a temperature of, for example, about 120 to about 250° C. for a period of about 5 to about 40 hours. This hydrothermal treatment may be continued under pressure until the treated product satisfies the specified BET specific surface area and secondary particle diameter. Higher temperatures within the above range are preferred. Treating temperatures exceeding about 250° C. may be employed, but without no particular benefit. Hence, the temperatures within the above-specified range are preferred.

The agent of this invention comprising the hydrotalcite solid solution of formula (1) as an active ingredient may be applied to synthetic resins containing halogens and/or acidic substances derived from at least one kind of catalysts, monomers and post-treating agents. Examples of such synthetic resins include synthetic resins produced by using halogen-containing Ziegler-type catalysts, such as low-density to high-density polyethylenes, polypropylene, polybutene-1, poly(4-methylpentene-1), ethylene/propylene copolymer, ethylene/propylene/polyene copolymers, ethylene/butene-1 copolymer, polybutadiene rubber and polyisoprene rubber; synthetic resins produced by using halogen-containing Friedel-Crafts catalysts, such as polybutene, polyacetal, butyl rubber, liquid polyisobutylene, petroleum resins and polybenzil; synthetic resins produced by using acidic substances such as sulfuric acid, phosphoric acid and hydrochloric acid as catalysts, such as diallyl phthalate resin, phenolic resins, xylene resin and silicone resins; synthetic resins produced by using catalysts containing halogens and/or acidic substances, synthetic resins derived from monomers containing halogens and/or acidic substances, for example polyvinyl chloride, copolymers of vinyl chloride with at least one comonomer selected from olefinic monomers such as ethylene and propylene, vinylidene halide monomers such as vinylidene chloride and vinylidene fluoride, vinyl acetate, vinyl ether monomers such as lauryl vinyl ether, maleic anhydride, maleic acid esters such as butyl maleate, butadiene and styrene, polyvinylidene chloride, vinylidene chloride copolymers, polyvinyl acetate, vinyl acetate copolymers, resins, polyorganosiloxanes, epihalohydrin rubbers, acrylic or methacrylic polymers or copolymers, epoxy chloroprenne rubber, fluorine rubber, polycarbonate resins, polyesters such as polyethylene terephthalate or polybutylene terephthalate, and polyurethane resins; post-halogenated synthetic resins such as post-chlorinated olefinic resins (e.g., chlorinated polyethylene), post-chlorinated vinyl chloride-type resins (e.g., chlorinated polyvinyl chloride), post-chlorosulfonated olefinic resins (e.g., chlorosulfonated polyethylene) and post-halogenated rubbers such (e.g., chlorinated or brominated butyl rubber); synthetic resins subjected to post-treatments (such as washing with acids), such as sulfuric acid, phosphoric acid or hydrochloric acid, or neutralization, for example ABS resin and polystyrene resin; synthetic resins containing halogen-containing fire retardants or flame retardants such as tetrabromobisphenol A, decabromodiphenyl oxide, or chlorinated paraffin; synthetic resins containing halogen-containing coloring agents or phenolic antioxidants such as isoindolinone or Phthalocyanine Green.

Thus, according to this invention, there is provided a synthetic resin composition having reduced corrosion-causing tendency and reduced coloration comprising (A) 100 parts by weight of a synthetic resin containing halogen and/or an acidic substance derived from at least one kind of catalysts, monomers and post-treating agents, and (B) about 0.001 to about 50 parts by weight, preferably about 0.01 to about 20 parts by weight, of a hydrotalcite solid solution represented by formula (1).

There is no particular restriction on the means of blending the synthetic resin (A) with the hydrotalcite solid solution (B) as an active ingredient. For example, the synthetic resin (A) and the hydrotalcite solid solution (B) are mixed as uniformly as possible with or without resin additives by the same means as known conventional means of mixing resins with, for example, stabiliziers or fillers. Mixing may be carried out by using known mixing devices such as a ribbon blender, a high-speed mixer, a kneader, a pelletizer or an extruder. Alternatively, it is possible to use a method by which a suspension of the anticorrosion or anticoloration imparting agent comprising the hydrotalcite solid solution as an active ingredient is added to a resin slurry immediately after polymerization, and the mixture is stirred and then dried.

The resin composition of this invention having reduced corrosion-causing tendency or coloration may further include various conventional additives for synthetic resin composition.

Examples of such conventional additives include inorganic heat stabilizers, for example, oxides, hydroxides, carbonates, sulfates, phosphates, phosphites and silicates of metals such as Li, Na, K, Mg, Ca, Sr, Ba, Pb, Zn, Cd, Zr, Al, Si, Sn, Sb and Bi, and salts formed between metals and halogenoxy acids such as perchloric acid, periodic acid, chloric acid, bromic acid, iodic acid, chlorous acid, hypochlorous acid and bromous acid;

organic acid/metal salt heat stabilizers, for example acidic salts, neutral salts and basic salts of the above-exemplified metals with organic acids, for example aliphatic carboxylic acid such as 2-ethylhexoic acid, lauric acid, myristic acid, palmitic acid, stearic acid, hydroxystearic acid, linoleic acid, behenic acid, isostearic acid, oleic acid, ricinoleic acid, caproic acid, heptanoic acid, n- or iso-octylic acid, pelargonic acid, caprylic acid, isodecanoic acid, undecylic acid, neotridecanoic acid, acrylic acid, linolenic acid, crotonic acid, acetoacetic acid and acetic acid, dibasic acids such as maleic acid, thiodipropionic acid and dithiopropionic acid, partial esters of these dibasic acids with substituted or unsubstituted aliphatic, alicyclic or aromatic alcohols, or cyclic acids such as benzoic acid, methylbenzoic acid, butylbenzoic acid, benzoylbenzoic acid, p-t-butylbenzoic acid, phenylacetic acid, salicylic acid, fumaric acid, naphthoic acid, abietic acid, phenylstearic acid, pyrrolidonecarboxylic acid, cinnamic acid, rosin acid and naphthenic acid;

organic acid/mixed metal salt heat stabilizers such as salts of the aforesaid organic acids with Ca/Zn, Ba/Cd, Ba/Zn, and Ba/Cd/Zn;

organotin-type heat stabilizers, for example mono(or di)alkyltin laurate compounds such as mono(or di)methyltin tri(or di)laurate, mono(or di)butyltin tri(or di)laurate and mono(or di)octyltin tri(or di) laurate, mono(or di)alkyltin maleate compounds such as mono(or di)methyltin maleate polymer, mono(or di)butyltin maleate polymer, mono(or di)methyltin tris(or bis)isooctyl maleate, mono(or di)butyltin tris(or bis)isooctyl maleate and mono(or di)octyltin tris(or bis)isooctyl maleate, and mono(or di)alkyltin mercaptide compounds such as mono(or di)methyltin tris(or bis)isooctylthioglycollate, mono(or di)octyltin tris(or bis)isooctylthioglycollate, mono(or di)butyltin tris(or bis)thioglycollate, mono(or di)methyltin thioglycollate (or 2-mercaptopropionate), mono(or di)butyltin thioglycollate (or 2-mercaptopropionate), mono(or di)octyltin thioglycollate (or 2-mercaptopropionate), mono(or di)methyltin tri(or di)doddecylmercaptide, mono(or di)butyltin tri(or di)dodecyl mercaptide, mono(or di)octyltin tri(or di)dodecyl mercaptide, mono(or di)methyltin sulfide, dioctyltin sulfide, didocecyltin sulfide, mono(or di)methyl or butyl or octyltin tris(or bis)2-mercaptoethyl oleate, thiobis[monomethyltin bis(2-mercaptoethyl oleate)], and thiobis[dimethyl or dibutyl or dioctyltin mono(2-mercaptoethyl oleate)];

epoxy compound-type heat stabilizers such as epoxidized soybean oil, diacetomonoglyceride of epoxydized soybean oil, epoxidized linseed oil fatty acid butyl ester, epoxidized linseed oil, epoxidized 1,2-polybutadiene, bisphenol A diglycidyl ether, 3,4-epoxycyclohexane carboxylate, epoxidized beef tallow oil, epoxidized cottonseed oil, epoxidized sunflower oil, epoxidized tall oil, epoxidized fish oil, epoxidized diacetomonolefins, methyl, butyl, isooctyl or 2-ethylhexyl, isodecyl, cyclohexyl, dihydrononyl, methoxyethyl, acetoxyethyl, benzoyl, tetrahydrofuryl, phenyl or p-t-butylphenyl epoxystearate, a butyl, n-octyl, isooctyl, 2-ethylhexyl ester of epoxytall oil acid, epoxytriacetomonoricinoleic acid glyceride, a 9,10-epoxystearic acid ester of 3,4-epoxycyclohexylmethanol, a 9,10,12,13-diepoxystearic acid of 3,4-epoxycyclohexylmethanol, a 2-ethyl-1,3-hexanediol ester of 3,4-epoxycyclohexylcarboxylic acid, a dialkyl (e.g., di-n-butyl, di-n-hexyl, di-n-decyl, di-isodecyl or di-n-butyldecyl) ester of epoxyhexahydrophthalic acid, 3,4-epoxy-6-methylcyclohexynecarboxylate, bis(3,4-epoxy-6-methylcyclohexylmethyl)adipate, and a condensate of an epihalohydrin and bisphenol A;

polyol-type heat stabilizers, for example partial esters formed between polyols such as pentaertythritol, mannitol, xylitol, sorbitol, glycerol, trimethylolpropane, polyethylene glycol, polyvinyl alcohol, 1,3-butanediol, propylene glycol, dipropylene glycol, ethylene glycol, diethylene glycol, neopentyl glycol, trimethylolethane, diglycerol, ditrimethylolpropane, ditrimethylolethane, di-, tri-, or tetra-pentaerythritol and tris(hydroxyethyl) isocyanurate and organic acids such as aliphatic carboxylic acids, aromatic carboxylic acids, amino acids or hydroxycarboxylic acids which includes, for example, aliphatic monocarboxylic acids such as octylic acid, lauric acid, myristic acid, palmitic acid, stearic acid, isostearic acid, hydroxystearic acid, oleic acid and ricinolenic acid, aliphatic dicarboxylic acids such as malonic acid, succinic acid, glutaric acid, adipic acid, pimelic acid, suberic acid, azelaic acid, sebacic acid, phthalic acid, maleic acid, fumaric acid, itaconic acid, thiodipropionic acid and dithiopropionic acid, aromatic carboxylic acids such as benzoic acid, methylbenzoic acid, salicyclic acid and phthalic acid, amino acids such as glycine, alanine, leucine, phenylalanine, methionine, aspartic acid, glutamic acid and lysine, and hydroxycarboxylic acids such as lactic acid, citric acid, tartaric acid and malic acid;

aminocarboxylic acid-type heat stabilizers such as a beta-aminocrotonic acid ester of butanediol, N-acetylglutamic acid and N-acetylmethionine;

sulfur-containing compound-type heat stabilizers, for example thiodipropionic acid esters such as dilauryl thiodipropionate, distearyl thiodipropionate and laurylstearyl thiodipropionate, triazinethiols such as 6-anilino-1,3,5-triazine-2,4-dithiol, and thiolcarboxylic acid anhydride such as thiolauric anhydride;

organic antimony-type heat stabilizers, for example mono(or di)alkylantimony laurate compounds such as mono(or di)methylantimony tri(or di)laurate, mono(or di)butylantimony tri(or di)laurate and mono(or di)octylantimony tri(or di)laurate, mono(or di)alkylantimony maleate compounds such as mono(or di)methylantimony maleate polymer, mono(or di)butylantimony maleate polymer, mono(or di)methylantimony tris(or bis)isooctylmaleate, mono(or di)butylantimony tris(or b)isooctyl maleate and mono(or di)octylantimony tris(or bis)isooctylmaleate, and mono(or di)alkylantimony mercaptide compounds such as mono(or di)methylantimony tris(or bis)isooctylthioglycollate, mono(or di)octylantimony tris(or bis)isooctylthioglycollate, mono(or di)butylantimony tris(or bis)thioglycollate, mono(or di)methylantimony thioglycollate (or 2-mercaptopropionate), mono(or di)butylantimony thioglycollate (or 2-mercaptopropionate), mono(or di)octylantimony thioglycollate (or 2-mercaptopropionate), mono(or di)methylantimony tri(or di)dodecylmercaptide, mono(or di)butylantimony tri(or di)dodecyl mercaptide, mono(or di)octylantimony tri(or di)dodecylmercaptide, mono(or di)methylantimony sulfide, dioctylantimony sulfide, didodecylantimony sulfide, mono-(or di)methyl or butyl or octylantimony tris(or bis)2-mercaptoethyloleate, thiobis[monomethylantimony bis(2-mercaptoethyloleate)] and thiobis[dimethyl or dibutyl or dioctylantimony mono(2-mercaptoethyloleate)];

phosphite-type heat stabilizers, for example triaryl phosphites such as triphenyl phosphite, tris(nonylphenyl) phosphite, tris(p-nonylphenyl) phosphite, tris(p-phenylphenyl) phosphite, tris(o-cyclohexylphenyl) phosphite, tri(mononony/dinonylphenyl) phosphite, phenyl-p-nonylphenyl phosphite and tris(2,4-di-tert-butylphenyl) phosphite, alkylaryl phosphites such as monoctyldiphenyl phosphite, dioctylmonophenyl phosphite, monodecylphenylphenyl phosphite, trialkyl phosphites such as tributyl phosphite, tridecyl phosphite, trilauryl phosphite, trioleyl phosphite and tristearyl phosphite, and oligophosphites such a pentaerythritol phosphite and bisphenol diphosphite;

beta-diketone compound-type heat stabilizers such as dehydropropionylacetic acid, dehydrobenzoylacetic acid, cyclohexane-1,3-dione, dimethonne, 2,2'-methylenebiscyclohexane-1,3-dione, 2-benzylcyclohexane-1,3-dione, acetyltetralone, palmitoyltetralone, stearoyltetralone, benzoyltetralone, 2-acetylcyclohexanone, 2-benzoylcyclohexanone, 2-acetyl-cyclohexane-1,3-dione, benzoyl-p-chlorobenzoylmethane, bis(4-methylbenzoyl)methane, bis(2-hydroxybenzoyl)methane, benzoylacetylmethane, tribenzoylmethane, diacetylbenzoylmethane, palmitoylbenzoylmethane, lauroylbenzoylmethane, 4-methoxybenzoylbenzoylmethane, bis(4-methoxybenzoyl)methane, bis(4-chlorobenzoyl)methane, bis(3,4-methylenedioxybenzoyl)methane, benzoylacetyloctylmethane, benzoylacetylphenylmethane, stearoyl-4-methoxybenzoylmethane, bis(4-t-butylbenzoyl)methane, benzoylacetylethylmethane, benzoyltrifluoroacetylmethane, diacetylmethane, butanoylacetylmethane, heptanoylacetylmethane, triacetylmethane, distearoylmethane, stearoylacetylmethane, palmitoylacetylmethane, lauryolacetylmethane, benzoylformylmethane, acetylformylmethylmethane, benzoylphenylacetylmethane, bis(cyclohexanoyl)methane and dipivaloylmethane, and salts of these compounds with metals such as Li, Na, K, Mg, Ca, Ba, Sr, Zn, Al, Zr and Sm;

nitrogen-containing compound-type heat stabilizers such as diphenylthiourea, beta-aminocrotonic acid esters of alcohols such as stearyl alcohol, cetyl alcohol, 1,3-butanediol and thiodiethylene glycol, 2-phenylindole and dihydro-1,4-dimethyl-2,6-dicarbodidecyloxy-3,5-pyridine;

plasticizers, for example phosphoric acid esters such as tributyl phosphate, triphenyl phosphate and tri-2-ethylhexyl phosphate, phthalic acid esters such as dimethyl phthalate, dibutyl phthalate, dioctyl phthalate and diisodecyl phthalate, aliphatic monobasic acid esters such as butyl oleate, glycerol monooleate, butyl stearate and butyl epoxystearate, aliphatic dibasic acid esters such as diisodecyl adipate, dibutyl adipate and di(2-ethylhexyl) adipate, dihydric alcohol esters such as diethylene glycol dibenzoate, hydroxycarboxylic acid esters such as methyl acetylricinolate, chlorinated paraffins, and waxes such as waxes, low-molecular-weight polystyrene and liquid paraffin;

antioxidants, for example phenolic antioxidants such as 2,6-di-tert-butyl-4-methylphenol, 2,4,6-tri-t-butylphenol, styrenated phenol, 2,2'-methylenebis(4-methyl6-t-butylphenol), 2,2'-bis(4-hydroxyphenyl)propane, 4,4'-butylidene-bis(6-t-butyl-3-methyl)phenol), 1,1-bis(4-hydroxyphenyl)cyclohexane, 2,6-bis(2'-hydroxy-3'-t-butyl- 5'-methylbenzyl)-4-methylphenol, 2,2'-thiobis-(4-methyl-6-t-butylphenol), 4,4'-thiobis-(3-methyl-6-t-butylphenol), octadecyl-3-(3', 5'-di-t-butyl-4'-hydroxyphenol) propionate, 2,4-dimethyl-6-t-butylphenol and 2,5-di-t-butylhydroquinone, and sulfur-containing antioxidants such as dilauryl thiodipropionate, dimyristyl thiodipropionate, distearyl thiodipropionate, 2-mercaptobenzothiazole and zinc dibutyldithiocarbamate;

ultraviolet absorbers, for example benzophenones such as 2-hydroxy-4-methoxybenzophenone, 2,2'-dihydroxy-4-methoxybenzophenone, 2-hydroxy-4-methoxy-4'-chlorobenzophenone, 2,2'-dihydroxy-4-n-octoxybenzophenone, 2-hydroxy4-n-octoxybenzophenone, 2,4-dihydroxybenzophenone, 2,4-benzoyl-resorcinol, resorcinol monobenzoate, 5-chloro-2-hydroxybenzophenone, 2,2'-dihydroxy-4,4'-dimethoxybenzophenone, 4-dodecyl-2-hydroxybenzophenone, 2,2', 4,4'-tetrahydroxybenzophenone, 2-hydroxy-4-methoxy-2'-carboxybenzophenone and 2-hydroxy-4-octoxybenzophenone, benzotriazoles such as 2-(2'-hydroxy-5'-methylphenyl)-benzotriazole, cyanoacrylates such as ethyl-2-cyano-3,3-diphenyl acrylate, salycylates such as phenyl salicylate, 4-t-butylphenyl salicylate and p-octylphenyl salicylate, nickel salts such as nickel bis(octylphenyl sulfide) and nickel bis[oethyl(3,5-di-tert-butyl-4-hydroxyenzyl)]phosphonate, and hindered amines such as bis(2,2,6,6-tetramethylpiperidinyl-4)sebacate;

antistatic agents such as polyethylene oxide, carbowax, pentaertythritol monostearate and sorbitan monopalmitate;

lubricants such as calcium stearate, zinc stearate, butyl stearate, polyethylene wax, palmitamide, stearyl alcohol and ethylenebis stearamide;

coloring agents such as carbon black, phthalocyanine, quinacridone, indoline, azo pigments, titanium dioxide, red iron oxide, yellow lead, iron oxide yellow and mineral violet;

fillers such as asbestos, glass fibers, talc, mica, ballastonite, calcium silicate, fibrous magnesium hydroxide, fibrous hydrotalcites, aluminum silicate and calcium carbonate; and impact strength improvers or processing aids such as MBS, ABS, chlorinated polyethylene, and acrylic polymers such as polymers or copolymers of methyl, butyl, and octyl esters of acrylic acid and/or methacrylic acid.

Other conventional additives that may be included in the composition of this invention are fluorescent agents, bactericides, fungicides, bleed-out inhibitors, antihaze agents such as a partial ester of glycerol or diglycerol with a saturated or unsaturated fatty acid, a partial ester of sorbitan with a saturated or unsaturated fatty acid, and an ethylene oxide adduct, crosslinking agents such as dithiol-s-triazine or its Ca, Ba or Zn salt, surface-active agents, mold releasing agents, viscosity reducing agents, stabilizers, blowing agents, infrared absorbers, surface-treating agents, and fire retardants.

The amounts of these additives may be selected properly. For example, the amounts may be about 0.1 to about 10% for the heat stabilizers, about 1 to about 70% for the plasticizers, about 0.01 to about 1% for the antioxidants, about 0.01 to about 1% for the ultraviolet absorbers, about 0.01 to about 1% for the antistatic agents, about 0.1 to about 5% for the lubricants, about 0.1 to about 5% for the coloring agents, about 1 to about 50% for the fillers, and about 1 to about 20% for the impact improvers or processing aids, all based on the weight of the synthetic resin containing halogen and/or an acidic substance.

The following Examples illustrate the present invention more specifically.

EXAMPLES 1–5 AND COMPARATIVE EXAMPLES 1–5

| Ingredient | Parts by weight |
| --- | --- |
| Polyvinyl chloride (degree of polymerization 700) | 100 |
| Glycerol ricinolate | 0.5 |
| Butyl alcohol | 0.5 |
| Di-n-octyl tin mercaptide | 0.8 |
| Heat stabilizer (see Table 2) | 1.2 |

In each run, the above ingredients were kneaded at 180° C. for 5 minutes by using rolls. The kneaded mixture was then press-formed into a sheet having a thickness of 1 mm. The transparency and initial coloration of the sheet were visually measured. The sheet was then put in an oven at 190° C. and its heat stability was measured. The results are shown in Table 1, and the heat stabilizers used are shown in Table 2.

Prior to use, each of the hydrotalcites as the heat stabilizers was surface-treated by putting it in hot water at about 80° C., and with stirring, adding 3% by weight, based on the weight of the hydrotalcite, of a hot aqueous solution of sodium stearate, dehydrated, dried and pulverized.

TABLE 1

| Run | Transparency | Heat stability (minutes) | Initial coloration | Foaming during processing |
| --- | --- | --- | --- | --- |
| Ex. 1 | Very good | 90 | Very good | None |
| Ex. 2 | Very good | 110 | Very good | None |
| Ex. 3 | Good | 80 | Good | None |
| Ex. 4 | Good | 80 | Good | None |
| Ex. 5 | Good | 80 | Good | None |
| CEx. 1 | Inferior | 80 | Inferior | None |
| CEx. 2 | Very inferior | 40 | Inferior | Vigorous |
| CEx. 3 | Very inferior | 40 | Inferior | Vigorous |
| CEx. 4 | Inferior | 60 | Very inferior | None |
| CEX. 5 | Very good | 60 | Very good | None |

*: Ex. = Example;
CEx. = Comparative Example

TABLE 2

| Run | Stabilizer | BET specific surface area ($m^2/g$) | Average secondary particle diameter ($\mu m$) |
| --- | --- | --- | --- |
| Ex. 1 | $Mg_{0.5}Zn_{0.17}Al_{0.33}(OH)_2(CO_3)_{0.165} \cdot 0.45H_2O$ | 15 | 0.2 |

TABLE 2-continued

| Run | Stabilizer | BET specific surface area ($m^2/g$) | Average secondary particle diameter ($\mu m$) |
|---|---|---|---|
| Ex. 2 | $Mg_{0.55}Zn_{0.15}Al_{0.3}(OH)_2(CO_3)_{0.17}$ | 17 | 0.3 |
| Ex. 3 | $Mg_{0.1}Ca_{0.3}Zn_{0.3}Al_{0.3}(OH)_2 \begin{pmatrix} CHCOO \\ \parallel \\ CHCOO \end{pmatrix}_{0.15} \cdot 0.41H_2O$ | 9 | 0.6 |
| Ex. 4 | $Mg_{0.6}Cd_{0.1}Al_{0.3}(OH)_2(CH_3COO^-)_{0.3} \cdot 0.34H_2O$ | 12 | 0.4 |
| Ex. 5 | $Mg_{0.50}Pb_{0.20}Al_{0.30}(OH)_2(CO_3)_{0.1} \cdot 0.52H_2O$ | 21 | 0.7 |
| CEx. 1 | $Mg_{0.7}Al_{0.5}(OH)_2(CO_3)_{0.15} \cdot 0.55H_2O$ | 17 | 0.3 |
| CEx. 2 | $Zn_{0.7}Al_{0.3}(OH)_2(CO_3)_{0.15} \cdot 0.53H_2O$ | 11 | 0.4 |
| CEx. 3 | $Cd_{0.8}Al_{0.2}(OH)_2(CO_3)_{0.1} \cdot 0.58H_2O$ | 14 | 0.6 |
| CEx. 4 | $Ca_{0.66}Al_{0.34}(OH)_{2.34} \cdot 0.62H_2O$ | 25 | 1.8 |
| CEx. 5 | Di-n-octyltin mercaptide | — | — |

EXAMPLES 6–12 AND COMPARATIVE time) was measured. The results are shown in Table 3.

TABLE 3

| Run | Stabilizer | BET specific surface area ($m^2/g$) | Average secondary particle diameter ($\mu m$) | Transparency | Time which elaspsed until the sheet turned yellow (minutes) | Heat stability time (minutes) |
|---|---|---|---|---|---|---|
| Ex. 6 | $Mg_{0.50}Zn_{0.18}Al_{0.32}(OH)_2(CO_3)_{0.16}$ | 15 | 0.2 | Very good | 30 | 80 |
| Ex. 7 | $Mg_{0.38}Zn_{0.30}Al_{0.32}(OH)_2(CO_3)_{0.16} \cdot 0.2H_2O$ | 12 | 0.3 | " | 30 | 60 |
| Ex. 8 | $Mg_{0.60}Zn_{0.14}Al_{0.26}(OH)_2(CO_3)_{0.13}$ | 20 | 0.2 | " | 20 | 70 |
| Ex. 9 | $Mg_{0.60}Zn_{0.20}Al_{0.20}(OH)_2(CO_3)_{0.10} \cdot 0.6H_2O$ | 22 | 0.2 | Good | 20 | 70 |
| Ex. 10 | $Mg_{0.50}Zn_{0.20}Al_{0.30}(OH)_2(NO_3)_{0.30}$ | 18 | 0.3 | Very good | 30 | 60 |
| Ex. 11 | $Mg_{0.5}Zn_{0.20}Al_{0.30}(OH)_2(OOCCH=CHCOO)_{0.15}$ | 17 | 0.4 | " | 30 | 60 |
| Ex. 12 | $Mg_{0.1}Ca_{0.4}Zn_{0.2}Al_{0.30}(OH)_{2.3} \cdot 0.25H_2O$ | 25 | 0.5 | " | 20 | 60 |
| CEx. 6 | $Mg_{0.70}Al_{0.30}(OH)_2(CO_3)_{0.15} \cdot 0.52H_2O$ | 15 | 0.3 | Slightly poor | 10 | 50 |
| CEx. 7 | $Zn_{0.70}Al_{0.30}(OH)_2(CO_3)_{0.15} \cdot 0.48H_2O$ | 10 | 0.4 | Poor | 0 | 10 |

EXAMPLES 6–7

| Ingredient | Parts by weight |
|---|---|
| Polyvinyl chloride resin | 100 |
| Zinc stearate | 0.2 |
| Stearoylbenzoylmethane | 0.2 |
| Montanic acid ester | 0.4 |
| Glycerol ricinolate | 0.8 |
| Heat stabilizer (surface-treated with 1% gamma-glycidoxypropyl-trimethoxysilane; see Table 3) | 1.0 |

In each run, the above ingredients were kneaded by rolls at about 180° C. for 5 minutes. The kneaded mixture was then press-formed at about 190° C. for 5 minutes into a sheet having a thickness of 1 mm. The transparency of the sheet was evaluated by visual observation. It was then put in an oven at 190° C., and its coloration was examined every 10 minutes. The time which elapsed until the sheet was blackened (heat stability

EXAMPLES 13–14 AND COMPARATIVE EXAMPLES 8–9

| Ingredient | Parts by weight |
|---|---|
| Polyvinyl chloride resin | 100 |
| Dioctyl phthalate | 25 |
| Cadmium stearate | 0.5 |
| Heat stabilizer (surface-treated with 1% silane coupling agent; see Table 4) | 2.0 |

The above ingredients were kneaded by rolls at about 180° C. for 5 minutes. The kneaded mixture was press-formed at about 190° C. for 5 minutes into a sheet having a thickness of 1 mm. The sheet was examined for initial color, and heat stability in an oven at 190° C. (the time which elapsed until the sheet was blackened). It was also subjected to a weatherablility test by outdoor exposure, and the time which elapsed until the sheet turned yellow was measured. The results are shown in Table 4.

TABLE 4

| Run | Stabilizer | BET specific surface area ($m^2/g$) | Average secondary particle diameter ($\mu m$) | Initial color | Heat stability (minutes) | Weatherability (day) |
|---|---|---|---|---|---|---|
| Ex. 13 | $Mg_{0.52}Zn_{0.16}Al_{0.32}(OH)_2(CO_3)_{0.16} \cdot 0.50H_2O$ | 16 | 0.3 | Very good | 80 | 210 |
| Ex. 14 | $Mg_{0.48}Zn_{0.18}Al_{0.34}(OH)_2(CO_3)_{0.17}$ | 18 | 0.4 | Very good | 90 | 290 |
| CEx. 8 | $Mg_{0.70}Al_{0.30}(OH)_2(CO_3)_{0.15} \cdot 0.52H_2O$ | 17 | 0.3 | Poor | 70 | 130 |

TABLE 4-continued

| Run | Stabilizer | BET specific surface area (m²/g) | Average secondary particle diameter (μm) | Initial color | Heat stability (minutes) | Weather-ability (day) |
|---|---|---|---|---|---|---|
| CEx. 9 | $Mg_{0.10}Zn_{0.60}Al_{0.30}(OH)_2(CO_3)_{0.15}\cdot 0.48H_2O$ | 14 | 0.5 | Poor | 20 | 0 |

EXAMPLES 15–19 AND COMPARATIVE EXAMPLES 10–16

In each run, polypropylene (chlorine content 200 ppm), high-density polyethylene (chlorine content 70 ppm) or linear low-density polyethylene (chlorine content 120 ppm) each obtained by using a highly active Ziegler-type catalyst supported on a magnesium chloride carrier without performing a deashing treatment was mixed with each of the inhibitor compounds indicated in Table 5-1 and 0.1%, based on the weight of the resin, each of Irganox 1010 and BHT as antioxidants, and melt-kneaded at about 230° C. in an extruder to form pellets. The pellets were subjected to an anticorrosion test. Furthermore, the pellets were injection-molded, and the yellowing resistance of the molded article was examined. Moreover, a film was prepared from the pellets by the inflation method, and its appearance was evaluated.

Prior to use, each of the inhibitors was dispersed uniformly in hot water by using a stirrer, and about 3%, based on the weight of the inhibitor, of sodium stearate in hot water was added. The mixture was stirred for about 30 minutes to form a uniform mixture, which was then dehydrated, dried and pulverized.

The results are shown in Table 5.

Anticorrosion test

A mild steel sheet, 40×40 mm in size, which had been well polished and degreased was embedded in the pellets obtained as above. The entire system was heated at 230° C. for 2 hours, and then allowed to cool. The mild steel sheet was pulled out from the resin, placed in a desiccator adjusted to a relative humidity of about 98%, and then left to stand for one day at room temperature. The degree of rust (corrosion) which occurred on the mild steel sheet was evaluated on a scale of classes 1 to 10 as follows, in which class 1 means no change occurred in the sheet, and class 10 means that rust occurred nearly all over the surface of the sheet. Class 4 or above means that the sheet has practical anticorrosive property on the mild steel sheet. In particular, class 3 or above is desirable.

Class 1: No change
Class 2: the area of rust is less than 1% of the entire area
Class 3: the area of rust is 1% to less than 5% of the entire area,
Class 4: the area of rust is 5% to less than 10% of the entire area,
Class 5: the area of rust is 10% to less than 20% of the entire area,
Class 6: the area of rust is 20% to less than 30% of the entire area,
Class 7: the area of rust is 30% to less than 50% of the entire area,
Class 8: the area of rust is 50% to less than 70% of the entire area,
Class 9: the area of rust is 70% to less than 90% of the entire area
Class 10: Rust occurred over nearly the entire surface.

Yellowing resistance test

A disc having a diameter of about 60 mm obtained by injection molding was put in a desiccator kept at 70° C. and a relative humidity of 100%, and left to stand for 20 days. The b value of the disc in accordance with the Hunter Lab system was measured by a color difference meter. Larger b values show greater yellowing.

TABLE 5-1

| Designation | Inhibitor | BET specific surface area (m²/g) | Average secondary particle diameter (μm) |
|---|---|---|---|
| A | $Mg_{0.5}Zn_{0.2}Al_{0.3}(OH)_2(CO_3)_{0.15}\cdot 0.52H_2O$ | 16 | 0.3 |
| B | $Mg_{0.51}Zn_{0.17}Al_{0.32}(OH)_2(CO_3)_{0.16}$ | 18 | 0.2 |
| C | $Mg_{0.1}Ca_{0.45}Zn_{0.15}Al_{0.30}(OH)_{2.3}\cdot 0.2H_2O$ | 20 | 0.4 |
| D | $Mg_{0.74}Al_{0.26}(OH)_2(CO_3)_{0.13}\cdot 0.61H_2O$ | 17 | 0.5 |
| E | $Zn_{0.72}Al_{0.28}(OH)_2(CO_3)_{0.14}\cdot 0.58H_2O$ | 15 | 0.3 |
| F | Calcium stearate | — | — |

TABLE 5-2

| Run | Polymer | Inhibitor | Amount of the inhibitor (wt %) | Corrosion resistance (class) | Yellowing resistance (b) | Appearance of the film (fisheye formation) |
|---|---|---|---|---|---|---|
| Ex. 15 | Polypropylene | A | 0.15 | 2 | 4.2 | Good |
| Ex. 16 | " | B | 0.15 | 1 | 3.8 | Very good |
| Ex. 17 | " | C | 0.15 | 3 | 4.9 | Good |
| CEx. 10 | " | D | 0.15 | 2 | 5.9 | Good |
| CEx. 11 | " | E | 0.15 | 8 | 8.6 | Very poor |
| CEx. 12 | " | F | 0.30 | 10 | 7.0 | Good |
| Ex. 18 | High-density polyethylene | B | 0.05 | 2 | 0.8 | Very good |
| CEx. 13 | High-density | D | 0.05 | 3 | 1.9 | Good |

TABLE 5-2-continued

| Run | Polymer | Inhibitor | Amount of the inhibitor (wt %) | Corrosion resistance (class) | Yellowing resistance (b) | Appearance of the film (fisheye formation) |
|---|---|---|---|---|---|---|
| CEx. 14 | High-density polyethylene | F | 0.20 | 7 | 4.8 | Good |
| Ex. 19 | Linear low-density Polyethylene | A | 0.10 | 2 | 1.3 | Good |
| CEx. 15 | Linear low-density Polyethylene | D | 0.10 | 2 | 2.7 | Good |
| CEx. 16 | Linear low-density Polyethylene | F | 0.20 | 10 | 5.0 | Good |

EXAMPLES 20 AND COMPARATIVE EXAMPLE 17

| Ingredient | Parts by weight |
|---|---|
| Polychloroprenene (Neoprene GS) | 100 |
| Carbon black (Seast S) | 29 |
| Stearic acid | 0.5 |
| Zinc oxide | 2 |
| Acid acceptor (see Table 6) | |

The above ingredients were kneaded in a customary manner by rolls. The mixture was cured by a hot press at 160° C. for 30 minutes to form a sheet having a thickness of 2 mm. The sheet was cut into a test piece having a size of 10 mm×10 mm. The test piece was immersed in hot water at 70° C. for 7 day, and its weight change was measured. The results are shown in Table 6. Smaller weight increases show better water resistance.

TABLE 6

| | Acid acceptor | | Water resistance (weight increase, mg/inch$^2$) |
|---|---|---|---|
| Run | Type | Amount (parts by weight) | |
| Ex. 20 | Mg$_{0.45}$Zn$_{0.23}$Al$_{0.32}$(OH)$_2$(CO$_3$)$_{0.16}$* | 8 | 36 |
| CEx. 17 | Magnesium oxide | 5 | 76 |

*Prior to use, the hydrotalcite solid solution was treated with about 1%, based on the weight of hydrotalcite solid solution, of gamma-mercaptopropyltrimethoxysilane, and then subjected to a treatment of removing water of crystallization at about 200° C.

EXAMPLES 21 AND COMPARATIVE EXAMPLE 18

| Ingredient | Parts by weight |
|---|---|
| Chlorosulfonyl polyethlene (HYPALON 40) | 100 |
| SRF carbon black | 40 |
| MBTS | 0.5 |
| Tetron A | 2 |
| Acid acceptor (see Table 7) | |

The above ingredients were kneaded by rolls in a customary manner. The mixture was cured at 160° C. for 30 minutes by a hot press to form a sheet having a thickness of 2 mm. A test piece having a size of 10 mm×10 mm was prepared from the sheet. The test piece was immersed in hot water at 70° C. for 7 days, and its weight change was measured. The results are shown in Table 7.

EXAMPLE 22 AND COMPARATIVE EXAMPLE 19

| Ingredient | Parts by weight |
|---|---|
| Chlorinated polyethylene | 100 |
| SRF carbon black | 50 |
| TOTM | 30 |
| OF-100 | 1 |
| M-181 | 2 |

Example 20 was repeated except that the above formulation was used. The results are shown in Table 7.

EXAMPLE 23 AND COMPARATIVE EXAMPLE 20

| Ingredient | Parts by weight |
|---|---|
| Brominated butyl rubber | 100 |
| Amorphous silica | 70 |
| Titanium oxide | 2 |
| Low-molecular-weight polyethylene | 2 |
| Zinc oxide | 3 |
| Acid acceptor (see Table 7) | |

Example 20 was repeated except that the above formulation was used. The results are shown in Table 7.

TABLE 7

| | Acid acceptor | | Water resistance (weight increase, mg/inch$^2$) |
|---|---|---|---|
| Run | Type | Amount (parts by weight) | |
| Ex. 21 | Mg$_{0.15}$Ca$_{0.4}$Zn$_{0.15}$Al$_{0.3}$(OH)$_{2.3}$·0.2H$_2$O | 8 | 35 |
| CEx. 18 | MgO | 5 | 74 |
| Ex. 22 | Mg$_{0.60}$Zn$_{0.16}$Al$_{0.24}$(OH)$_2$(CO$_3$)$_{0.12}$ | 10 | 31 |
| CEx. 19 | MgO | 10 | 61 |

TABLE 7-continued

| Run | Acid acceptor Type | Amount (parts by weight) | Water resistance (weight increase, mg/inch$^2$) |
|---|---|---|---|
| Ex. 23 | $Mg_{0.50}Zn_{0.25}Al_{0.25}(OH)_2(CO_3)_{0.125}$ | 5 | 32 |
| CEx. 20 | MgO | 5 | 60 |

EXAMPLE 24 AND COMPARATIVE EXAMPLES 21-22

| Ingredient | % by weight |
|---|---|
| ABS | 80 |
| Bromine-containing fire retardant (PYROCHECK-778) | 15 |
| Antimony trioxide | 5 |
| Antioxidant (Irganox 1010) | 0.2 |
| Stabilizer | 1.0 |

A fire-retardant ABS resin composition having the above formulation was mixed and kneaded at 230° C. in an extruder. The mixture was then injection-molded at 200° C. to form a disc having a thickness of about 3 mm. The disc was put in an oven at 100° C., and treated for 30 days. The degree of yellowing of the sample was determined by measuring its b value in accordance with the Hunter Lab system. The results are shown in Table 8.

TABLE 8

| Run | Stabilizer | BET specific surface area (m$^2$/g) | Average secondary particle diameter ($\mu$m) | Yellowing (b) |
|---|---|---|---|---|
| Ex. 24 | $Mg_{0.48}Zn_{0.20}Al_{0.32}(OH)_2(CO_3)_{0.16}$ | 18 | 0.2 | 9.8 |
| CEx. 21 | Calcium stearate | — | — | 21.9 |
| CEx. 22 | $Mg_{0.7}Al_{0.3}(OH)_2(CO_3)_{0.15} \cdot 0.55H_2O$ | 15 | 0.3 | 15.5 |

EXAMPLE 25 AND COMPARATIVE EXAMPLES 26-27

In each run, an ethylene/vinyl acetate copolymer having a vinyl acetate content of 33% was mixed with 0.5%, based on the weight of the copolymer, of each of the stabilizer compounds indicated in Table 9 in an attempt to remove the smell of acetic acid generated by thermal decomposition and to prevent yellowing. The mixture was melt-kneaded to form pellets. The pellets were heated at 250° C. for 5 minutes. Acetic acid generated was caused to be absorbed by water, and then neutralized and titrated with sodium hydroxide to measure the amount of acetic acid formed by decomposition. Separately, the b value of the heat-treated sample in accordance with the Hunter Lab system was measured by a color difference meter and the degree of yellowing of the sample was determined. The results are shown in Table 9.

TABLE 9

| Run | Stabilizer | Amount of acetic acid generated (mg/EV Al g) | Yellowing (b) |
|---|---|---|---|
| Ex. 25 | $Mg_{0.5}Zn_{0.18}Al_{0.32}(OH)_2(CO_3)_{0.16}$ (BET: 15 m$^2$/g; secondary particles: 0.4 $\mu$m) | 0.02 | 2.1 |
| CEx. 16 | $Mg_{0.68}Al_{0.32}(OH)_2(CO_3)_{0.16} \cdot 0.52H_2O$ (BET: 15 m$^2$/g; secondary particles: 0.5 $\mu$m) | 0.10 | 3.4 |
| CEx. 27 | Calcium stearate | 0.62 | 6.8 |

EXAMPLE 26 AND COMPARATIVE EXAMPLES 28-29

In each run, polyacetal (containing 50 ppm of Cl as a catalyst residue) obtained by polymerization in the presence of a Friedel-Crafts catalyst (anhydrous aluminum chloride) was mixed with 0.1%, based on the weight of polyacetal, of each of the stabilizers indicated in Table 10, and then kneaded at 185° C. by an extruder to form pellets. The pellets were put in an oven at 120° C. and heat-treated for 5 days. Thereafter, the degree of yellowing (Hunter Lab system "b") of the pellets was measured by a color difference meter. The results are shown in Table 10.

TABLE 10

| Run | Stabilizer | BET specific surface area (m$^2$/g) | Average secondary particle diameter ($\mu$m) | Yellowing (b) |
|---|---|---|---|---|
| Ex. 26 | $Mg_{0.6}Zn_{0.2}Al_{0.2}(OH)_2(CO_3)_{0.1}$* | 20 | 0.3 | 2.1 |
| CEx. 28 | $Mg_{0.7}Al_{0.3}(OH)_2(CO_3)_{0.15} \cdot 0.55H_2O$* | 17 | 0.4 | 17.5 |

TABLE 10-continued

| Run | Stabilizer | BET specific surface area ($m^2/g$) | Average secondary particle diameter ($\mu m$) | Yellowing (b) |
|---|---|---|---|---|
| CEx. 29 | Calcium stearate | — | — | 17.9 |

*Prior to use, each of these hydrotalcite solid solutions was treated in an aqueous medium with 1%, based on its weight, of a titanate-type coupling agent (iso-propyltriisostearoyl titanate).

What is claimed is:

1. A synthetic resin composition having reduced corrosion-causing tendency and coloration, said composition comprising
   (A) 100 parts by weight of a synthetic resin containing halogen and/or an acidic substance derived from at least one kind of catalysts, monomers and post-treating agents, and
   (B) 0.001 to 50 parts by weight of a hydrotalcite solid solution represented by the following formula (1)

$$[(M_1{}^{2+})_{y1}(M_2{}^{2+})_{y2}]_{1-x}M_x{}^{3+}(OH)_2A_{x/n}{}^{n-}\cdot mH_2O \qquad (1)$$

wherein $M_1{}^{2+}$ represents at least one divalent metal cation selected from the group consisting of Mg, Ca, Sr and Ba, $M_2{}^{2+}$ represents at least one divalent metal cation selected from the group consisting of Zn, Cd, Pb and Sn, $M^{3+}$ represents a trivalent metal cation, $A^{n-}$ represents an anion having a valency of n, and x, y1, Y2 and m are positive numbers represented by the following expressions $0 < x \leq 0.5,$ $0 < y1,$ $0 < y2,$ $0.5 \leq y1 + y2 < 1,$ and $0 \leq m < 2.$ 2. The composition of claim 1 wherein in formula (1), $y1 \geq y2$.

3. The composition of claim 1 wherein in formula (1), $0.2 \leq x \leq 0.4$.

4. The composition of claim 1 wherein the hydrotalcite solid solution is surface-treated with a surface treating agent selected from the group consisting of higher fatty acids, anionic surface-active agents, glycerol fatty acid esters and coupling agents.

5. The composition of claim 1 wherein in formula (1), $M_1{}^{2+}$ is Mg or both Mg and Ca, and $M_2{}^{2+}$ is Zn, or both Zn and Cd.

6. The composition of claim 1 wherein in formula (1), $M^{3+}$ is Al.

7. The composition of claim 1 wherein the compound of formula (1) is represented by the following formula (1)'

$$[(Mg^{2+} \text{ or } Mg^{2+} \text{ and } Ca^{2+})_{y1}(Zn^{2+} \text{ and/or } Cd^{2+})_{y2}]_{1-x}Al_x{}^{3+}(OH)_2(CO_3)_{x/2}\cdot mH_2O \qquad (1)'$$

wherein x, y1, y2 and m are as defined with regard to formula (1).

8. The composition of claim 1 wherein the hydrotalcite solid solution has a BET specific surface area of not more than about 30 $m^2/g$ and an average secondary particle diameter of not more than about 5 micrometers.

9. A method for preventing the corrosion-causing tendency or coloration of a synthetic resin containing halogen and/or an acidic substance derived from at least one kind of catalysts, monomers and post-treating agents, which comprises incorporating 0.001 to 50 parts by weight, per 100 parts by weight of said resin, of a hydrotalcite solid solution represented by the following formula (1)

$$[(M_1{}^{2+})_{y1}(M_1{}^{2+})_{y2}]_{1-x}M_x{}^{3+}(OH)_2A_{x/n}{}^{n-}\cdot mH_2O \qquad (1)$$

wherein $M_1{}^{2+}$ represents at least one divalent metal cation selected from the group consisting of Mg, Ca, Sr and Ba, $M_2{}^{2+}$ represents at least one divalent metal cation selected from the group consisting of Zn, Cd, Pb and Sn, $M^{3+}$ represents a trivalent metal cation, $A^{n-}$ represents an anion having a valency of n, and x, y1, y2 and m are positive numbers represented by the following expressions $0 < x \leq 0.5,$ $0 < y1,$ $0 < y2,$ $0.5 \leq y1 + y2 < 1,$ and $0 \leq m < 2,$ in said resin.

10. The composition of claim 1 wherein in formula (1) $M_1{}^{2+}$ is Mg, $M_2{}^{2+}$ is Zn, $M^{3+}$ is Al and $A^{n-}$ is $CO_3$.

11. The composition of claim 1 wherein the hydrotalcite solid solution is $Mg_{0.5}Zn_{0.17}Al_{0.33}(OH)_2(CO_3)_{0.165}$, $Mg_{0.55}Zn_{0.15}Al_{0.3}(OH)_2(CO_3)_{0.17}$, $Mg_{0.50}Zn_{0.18}Al_{0.32}(OH)_2(CO_3)_{0.16}$, $Mg_{0.52}Zn_{0.16}Al_{0.32}(OH)_2(CO_3)_{0.16}$, $Mg_{0.48}Zn_{0.18}Al_{0.34}(OH)_2(CO_3)_{0.17}$ or $Mg_{0.51}Zn_{0.17}Al_{0.32}(OH)_2(CO_3)_{0.16}$.

* * * * *